2,883,265
PREPARATION OF METALLIC HALIDES

Arthur W. Evans, Middlesbrough, Arthur N. C. Bennett, Eaglescliffe, and James D. Groves, Stockton-on-Tees, England, assignors to British Titan Products Company Limited, York, England, a corporation of Great Britain No Drawing. Application November 21, 1955
Serial No. 548,271

12 Claims. (Cl. 23—87)

This invention relates to a novel method of preparing titanium tetrachloride and is particularly directed to an improved method of preparing titanium tetrachloride by chlorination of iron-titanium bearing materials containing in excess of about 10 percent by weight of iron in a readily chlorinatable form and in excess of about 10 percent by weight of titanium. The invention is particularly directed to the chlorination of natural titanium oxide bearing materials, such as ilmenite or like oxide bearing materials containing a substantial amount of iron and a substantial amount of titanium, as well as chlorination of derivatives of such products in which the concentration of titanium has been enhanced.

The chlorination of ilmenite is the subject of many prior publications which disclose reaction of chlorine with such an ore at a temperature at or above red heat, particularly in the presence of carbon or other reducing agents. The chlorination has been conducted using a variety of mechanical techniques, of which the more popular is the shaft furnace, since it has been established that by this means the exothermic heat of reaction is at least sufficient to maintain the reaction in a continuous operation.

An especially effective method of conducting chlorination of a titanium bearing material involves the chlorination of the material in a fluidized or dynamic bed. In such a process the titanium material is suspended partially or completely in an upwardly flowing stream of a chlorinating gas. Then the velocity of the chlorination gases is sufficiently high, the resulting bed of reacting materials is highly turbulent and has many of the fluid characteristics of a boiling liquid although usually having a well defined upper surface. Because of the movement of the particles in the bed, substantially uniform temperature tends to be established throughout the depth of the bed. This is a highly efficient method of effecting chlorination of titanium bearing materials.

Investigation of the process of attempting to effect chlorination of a titanium bearing material containing substantial amounts of iron as well as substantial amounts of titanium, such as ilmenite, in a dynamic bubbling or fluidized bed has resulted in the discovery that a selective chlorination tends to take place whereby the iron components are chlorinated, ferric chloride being formed and vaporized, leaving the titanium component substantially unchlorinated. In consequence, the reaction occurs in stages with the titanium components undergoing chlorination after the major portion of the iron has been chlorinated. This results in substantial variation in the composition of the chloride vapors which at one time may contain a large amount of iron chloride and little titanium tetrachloride and later a large amount of titanium tetrachloride and little iron chloride. This wide variation in the composition of the chloride vapor makes difficult the control of selective condensation of iron chloride from the titanium tetrachloride vapor. This is particularly the case where chlorination of ore at high rates, for example, 1000 pounds per hour, is undertaken.

According to the present invention a novel method has been provided according to which an ore containing in excess of about 10 percent by weight of titanium and at least about 10 percent by weight of iron, such as ilmenite ore or like material, may be chlorinated in a single stage in a fluidized bed whereby to effect simultaneous chlorination of both iron and titanium components and consequent production of a vapor which contains appreciable amounts of both iron chloride and titanium tetrachloride. Moreover, the composition of the vapor may be maintained substantially uniform. Consequently, control of the condenser system to selectively condense iron chloride from titanium tetrachloride is simplified because there is only minor variation in the composition of the gases to be condensed.

In the practice of the process herein contemplated, a fluidized or bubbling bed of solid titanium oxide bearing material containing a high concentration of titanium (preferably in excess of 90 percent $TiO_2$, based upon the components which are chlorinated) is established and is subjected to chlorination whereby titanium tetrachloride is formed and vaporized. To effect continuation of the chlorination, an iron-titanium bearing material, such as ilmenite, containing in excess of 10 percent by weight of iron and 10 percent by weight of titanium, is added to the bed with or without more concentrated ore, such as rutile, continuously or periodically (usually with carbonaceous reducing agent and with or without inert diluent) and the rate of such addition is correlated with the rate of chlorination so that the ratio of titanium to iron in chloridizable form (as distinguished from ferric chloride or the like which does not react with chlorine in the practice of the process) in the fluidized bed is substantially higher than the ratio of titanium to iron in the iron-titanium bearing material added to the bed.

It will be understood that in effecting a reaction of chlorine with an iron-titanium bearing material in a fluidized or dynamic bed, the actual composition of the bed may vary widely depending upon the rate of addition of fresh titanium-iron bearing materials to the bed as well as the composition of the feed and the rate of chlorination of the bed components. If the rate of addition is sufficiently rapid, the concentration of iron in the bed is high, for example, well above 10 percent Fe by weight. In such a case, the iron chlorinates and little titanium tetrachloride is formed. Thus, the bed during chlorination becomes enriched of titanium and denuded of iron.

We have found that after the iron content of the bed falls to a point where the ratio of titanium to iron in the bed is above 10 to 1, preferably above 20 to 1, titanium tetrachloride is formed in substantial amount. We have further discovered that by controlling the rate of addition of the iron-titanium bearing material so that the titanium content of the fluid bed remains above 10 parts by weight of titanium per part by weight of iron, preferably at least 20 or more parts of titanium by weight per part by weight of iron, during the major part or substantially all of the chlorination period, effective chlorination of both the titanium and the iron components takes place simultaneously and iron chloride and titanium tetrachloride may be produced substantially in the molecular proportion of iron to titanium in the feed.

In general, the rate of addition of the iron-titanium bearing material to the ore bed is slow enough to ensure establishment and maintenance of a fluidized bed in which the ratio of iron to titanium is less than one-half of the ratio of iron to titanium in the ore undergoing chlorination. Usually, the rate of addition of such material is held low enough so that the iron content of the fluidized bed, based upon the iron and titanium content thereof, is less than 10 percent and preferably is less than about 5 percent by weight, the TiO₂ content being in excess of 85 to 90 percent based upon the TiO₂ and iron content of the bed.

The chlorination herein contemplated may be conducted at any convenient temperature at which the titanium bearing material chlorinates. Normally this temperature ranges from about 600 to 1100° C. but may be higher. Preferably, however, the reaction temperature of the bed is maintained at about 850 to 1000° C.

The fluidized chlorination may be conducted in a shaft furnace suitably equipped to supply the chlorinating gas uniformly throughout the bed. Normally, the fluidizing and chlorinating gas is supplied through a perforated plate fitted with orifices such as, for example, have been described in copending application Serial No. 449,002, filed August 10, 1954, now abandoned. As described in such application, the pressure drop across the orifices is maintained high with respect to the pressure drop across the bed.

To initiate the operation, a chlorinator, such as a shaft furnace, and having a bed of mineral rutile or other suitable form of titanium oxide admixed with a suitable proportion of carbon, may be preheated either by hot gases led in or consumed therein or by the use of oxygen passing through the bed and reacting with the carbon constituent of the mixture in the bed. Preferably, the bed is heated by injection of a burner onto the mass fluidized by air since, in this way, heating is effected both economically and without excessive local overheating.

When a temperature of 800–900° C. has been attained, the chlorine is passed through the bed to suspend or fluidize the particles thereof in the chlorinating gas and to chlorinate the bed. As soon as this chlorination has been initiated, ilmenite or like iron-titanium bearing material is fed into the bed, together with the required amount of carbon, at such a rate that the iron and titanium constituents in the gases emerging from chlorination are in the same proportion as the constituents, iron and titanium, occurring in the ore fed in. The gases produced are led away from the chlorinator and subsequently cooled.

The composition of the bed may be established readily by periodically withdrawing samples therefrom. This may be done conveniently by removing a portion of the fluidized bed or by temporarily discontinuing the flow of fluidizing gases whereby the bed becomes static and collecting a sample of the static bed for analysis. The composition of the bed may be controled by adjusting the rate of introducing ore into the bed in accordance with these analyses, decreasing the rate as the ratio of chlorinatable iron to titanium in the bed increases and vice versa.

According to a further embodiment, the rate of addition of the iron-titanium bearing material may be controlled in accordance with the periodic analyses of the gases containing the vaporized metal halides withdrawn from the chlorination zone. In such a case, the vapors may be analyzed for ioron chloride and titanium tetrachloride. If the ratio of iron in the chloride vapors to titanium in the chloride vapors rises above the ratio of chlorinatable iron to chlorinatable titanium in the ore, addition of ore is discontinued until after the titanium tetrachloride content in the vapors increases.

According to a further embodiment of the invention, it is advantageous to maintain the rate of addition so constant that no substantial change takes place in the composition of the bed and/or the composition of the gaseous vapors produced by the chlorination. Thus, the addition of the iron-titanium bearing materials subjected to chlorination to the fluidized bed is preferably made in such small increments and at such regular intervals that the iron content of the bed does not change more than about 2 or 3 percent by weight in any period of 15 minutes when operating the process over a period of several hours, for example 12 hours or more. By this means the iron chloride content of the vapors remains relatively uniform. This makes more easy the problems of condensation since, if large increments of iron-titanium bearing material are added to the bed, substantial variation of the iron chloride content of the vapors thus produced can take place. Such variation makes more complex the problems of condensation of the iron and titanium chlorides since a more accurate and more exact control of the condensing process becomes necessary. Thus, for best results, if the bed at any instant during chlorination contains for example 2 percent iron, the ore added should not increase the iron content to more than 4 or 5 percent in a period of 15 minutes and rates of addition should be controlled so that sudden changes particularly increases in the iron content in amount of more than 2 or 3 percent in the iron content in amount more than 2 or 3 percent in the bed do not occur during the major portion of the reaction period.

An especially successful chlorination of an ore containing 55 to 65 percent of TiO₂ and in the range of about 25 percent Fe by weight, such as a Quilon ilmenite, is effected when the rate of addition of reactants is regulated so that the vapor formed contains about 25 to 35 percent by volume of titanium tetrachloride and 15 to 25 percent by volume of iron chloride.

The following examples are illustrative.

*Example I*

A shaft furnace 18 inches in internal diameter and 11 feet high was fitted with a perforated base having a gas chamber below and ports fitting into the gas chamber for admitting chlorine and air separately. The top of the furnace was sealed with an inlet port for feeding the mineral and coke constituents, with provision for the temporary insertion of a gas burner described below for heating up the apparatus. The perforations in the perforated base, totalling 20, were each fitted with a detachable orifice on the under side of the plate and with a gas-permeable disc on the upper side. The orifices each had a diameter of 1.2 millimeters and the perforated discs were constructed of sintered ceramic material, each having a permeability to air at room temperature and pressure of eight liters per minute for a pressure drop of one inch of water.

The gases produced by the chlorination were led to a condensation system where ferric chloride and titanium tetrachloride were condensed and recovered. In the operation of this apparatus, the procedure was as follows:

Above the perforated plate of the chlorinator was introduced a bed 3 feet high consisting of 80 percent by weight of mineral rutile having a particle size 80 to 200 microns and 20 percent by weight of coke having a particle size 50 to 500 microns. This bed was fluidized by the passage of air through the perforated plate described above at the rate of 200 pounds per hour and was heated by means of a suitably constructed gas burner inserted through the top of the furnace, the flame playing onto the top of the fluidized mass. In this way the temperature was raised to 950° C. The gas jet was then removed and the air supply cut off.

The carbon concentration of the bed was adjusted to its initial value by addition of further coke. Chlorine was immediately admitted into the chamber below the perforated plate in order to fluidize the bed at the rate of 180 pounds per hour. At the same time, ilmenite ore of size 100 to 250 microns and coke of size as above were fed to the bed in such quantities that the height of the bed was maintained at 3 feet and the coke content of the bed was maintained at 20 percent by weight. These quantities averaged about 110 pounds ilmenite and 20 pounds coke per hour. The ore used was Quilon ilmenite containing 59.6 percent TiO₂, 24.9 percent Fe, and a total of 1.2 percent by weight of alkali and alkaline earth oxides. The temperature of the bed was controlled so that it remained at about 950° C. The gases left the chlorination furnace at a temperature of 900° C. and contained less than one percent of free chlorine.

During substantially the entire period of the run, the weight ratio of iron oxide content to titanium oxide of the bed remained below 0.1 to 1.

*Example II*

A bed was established in the shaft furnace described in Example I having a depth when static of 3 feet. This bed had the composition:

| | Percent by weight |
|---|---|
| Fe | 1.3 |
| $TiO_2$ | 42.0 |
| $SiO_2$ | 11.0 |
| $ZrO_2$ | 11.0 |
| $Al_2O_3$ | 1.7 |
| Carbon | 28.0 |

This bed was fluidized in a stream of chlorine introduced at a rate of 240 pounds per hour. The temperature of the bed was 910° C.

The process was carried out by adding 70 pounds per hour of ilmenite ore containing 59 percent $TiO_2$, 26 percent $Fe_2O_3$, and 11 percent FeO by weight; 70 pounds per hour of rutile containing 96 percent $TiO_2$ and 1 percent $Fe_2O_3$; and coke at a rate of 30 pounds per hour. The coke had a particle size of 150 to 750 microns. These ores, which had a particle size of 80 to 300 microns, and the coke were introduced continuously at a uniform rate and no substantial variation in the composition of the bed occurred, iron chloride and titanium tetrachloride being formed and vaporized substantially in the same proportion as iron and titanium were introduced into the bed. The chlorination was continued over a period of 48 hours.

The process as explained in the above examples is capable of numerous variations. For example, ilmenite of larger particle size range, for example 50 to 500 microns, and carbon having a particle size of 50 to 1500 microns may be used in lieu of the materials specified in the above example. The ores subjected to treatment may contain from about 20 to 80 percent by weight of $TiO_2$ and about 10 to 40 percent by weight of iron.

Mixtures of such ores and rutile, which contains in excess of 90 percent by weight of $TiO_2$, also may be subjected to chlorination as herein contemplated, as is shown in Example II.

Also, it is possible to conduct the process herein contemplated using products resulting from a beneficiation process of an iron-titanium oxide bearing material in which a portion of the iron has been removed. Thus, titanium oxide bearing slags containing in excess of about 10 percent FeO and/or $Fe_2O_3$ can be subjected to chlorination according to the present invention. Various other iron-titanium bearing materials, such as iron-titanium carbides or the like, may be chlorinated in the same manner.

In order to obtain maximum efficiency in the utilization of chlorine introduced into the fluidized bed, it is generally found desirable to introduce the chlorine at a rate of about 40 to 200 pounds, preferably 60 to 200 pounds, per hour per square foot of reactor cross-section. Lower rates of chlorine introduction appear to reduce the efficiency of chlorine utilization. Using the rate of chlorine introduction herein disclosed, it is possible to obtain utilization of 98 to 99 percent by weight of the chlorine in the formation of metallic chlorides.

According to a further embodiment, other chlorinating gases, such as phosgene, and the like may be used in lieu of all or a portion of the elemental chlorine in the above described process.

Although the present invention has been described with reference to the specific details of certain embodiments, it is not intended that such embodiments shall be regarded as limitations upon the scope of the invention except insofar as included in the accompanying claims.

This application is a continuation-in-part of application Serial No. 449,002, filed August 10, 1954, now abandoned.

What is claimed:

1. In a method of chlorinating an iron-titanium bearing material containing at least 10 percent by weight of iron in chlorinatable form and at least 10 percent by weight of titanium, the improvement which comprises establishing a fluidized bed comprising a $TiO_2$ bearing material and a carbonaceous reducing agent in a chlorinating gas, the $TiO_2$ content of the bed being at least 85 percent by weight and the iron less than 10 percent based on the total $TiO_2$ and iron content in the bed, maintaining the temperature of the bed above about 600° C. whereby titanium tetrachloride is formed and volatilized, introducing said iron-titanium bearing material and a carbonaceous reducing agent into the bed whereby chlorination of said material occurs and further iron chloride and titanium tetrachloride are formed, and controlling the rate of introduction of said iron-titanium bearing material into the fluidized bed to maintain the $TiO_2$ content of the bed at least 85 percent by weight, based upon the $TiO_2$ and iron in the bed, whereby the ratio of iron to titanium in chlorinatable form in the bed is maintained substantially below the ratio of iron to titanium in chlorinatable form in the iron-titanium bearing material fed to the bed.

2. In a method of chlorinating an iron-titanium bearing material containing 20 to 80 percent $TiO_2$ by weight and 10 to 40 percent by weight of iron, the improvement which comprises establishing a dynamic bed of titanium dioxide and carbon containing material in a chlorinating gas, the $TiO_2$ content of the bed being at least 85 percent by weight based on the total $TiO_2$ and iron content in the bed, maintaining the temperature of the bed above 600° C., introducing said iron-titanium bearing material and a carbonaceous reducing agent into the bed whereby chlorination of said material occurs, and controlling the rate of introduction of said iron-titanium bearing material to maintain the ratio of chlorinatable iron to chlorinatable titanium in the bed substantially below one to 10 and substantially below the ratio of said materials in the iron-titanium bearing material fed to the bed.

3. The process of claim 2 wherein the weight ratio of chlorinatable iron to chlorinatable titanium in the bed is maintained below 0.1 to 1.

4. The process of claim 2 wherein the weight ratio of chlorinatable iron to chlorinatable titanium in the bed is held below 0.05 to 1.

5. In a method of chlorinating an iron-titanium ore which contains 10 to 40 percent by weight of iron and 20 to 80 percent of $TiO_2$, the improvement which comprises establishing a fluidized bed containing $TiO_2$ and a carbonaceous reducing agent in a chlorinating gas, the titanium oxide content of the bed being at least 10 parts by weight per 1 part of by weight of iron maintaining the temperature of the bed above 600° C., introducing said iron-titanium ore and carbonaceous reducing agent into said bed whereby chlorination of said ore occurs, and controlling the rate of introduction of said ore into the bed so that the iron content of the bed remains below 10 percent and the $TiO_2$ content above 90 percent by weight, based upon the amount of iron and $TiO_2$ therein.

6. In a method of chlorinating an iron-titanium ore which contains at least 10 percent by weight of iron oxide and at least 10 percent by weight of titanium, the improvement which comprises establishing a fluidized bed containing $TiO_2$ and a carbonaceous reducing agent in a chlorinating gas, the titanium oxide content of the bed being at least 10 parts by weight per 1 part by weight of iron maintaining the temperature of the bed above 600° C., introducing said iron-titanium ore and carbonaceous reducing agent into said bed whereby chlorination of said ore occurs, and controlling the rate of introduction of said ore into the bed so that the iron content of the bed remains below 10 percent and the $TiO_2$ content above 90 percent by weight, based upon the amount of iron and $TiO_2$ therein, and the percentage concentration of iron in the bed does not change more than 3 percent within a period of 15 minutes during chlorination.

7. In a method of chlorinating an iron-titanium bearing material containing at least 10 percent by weight of iron in chlorinatable form and at least 10 percent by weight of titanium, the improvement which comprises establishing a fluidized bed comprising a $TiO_2$ bearing material and a carbonaceous reducing agent in a chlorinating gas, the $TiO_2$ content of the bed being at least 85 percent by weight based on the total weight of $TiO_2$ and iron in the bed, maintaining the temperature of the bed above about 600° C. whereby titanium tetrachloride is formed and volatilized, introducing said iron-titanium bearing material and a carbonaceous reducing agent into the bed whereby chlorination of said material occurs and further iron chloride and titanium tetrachloride are formed, and controlling the rate of introduction of said iron-titanium bearing material into the fluidized bed to maintain the ratio of iron to titanium in chlorinatable form in the bed below 1 to 10 and so that the percentage concentration of iron in the bed does not change more than 3 percent within a period of 15 minutes during chlorination.

8. The process of claim 2 wherein the weight ratio of chlorinatable iron to chlorinatable titanium in the bed is held below 0.1 to 1 and the percentage concentration of iron in the bed is controlled so that it does not change more than 3 percent in a period of 15 minutes and the $TiO_2$ content of the bed is at least 90% by weight.

9. The process of claim 6 wherein the ore subjected to chlorination contains 20 to 80 percent by weight of $TiO_2$ and 10 to 40 percent by weight of iron and the $TiO_2$ content of the bed is at least 90% by weight.

10. In a continuous method of chlorinating an iron-titanium bearing material containing at least 10 percent by weight of iron oxide in chlorinatable form and at least 10 percent by weight of titanium, the improvement which comprises establishing a fluidized bed comprising a $TiO_2$ bearing material and a carbonaceous reducing agent in a chlorinating gas, the ratio of chlorinatable iron to chlorinatable titanium in the bed being below 1 to 10, maintaining the temperature of the bed above about 600° C. whereby titanium tetrachloride is formed and volatilized, introducing said iron-titanium bearing material and a carbonaceous reducing agent into the bed whereby chlorination of said material occurs and iron chloride and further titanium tetrachloride is formed, and controlling the rate of introduction of said iron-titanium bearing material into said fluidized bed to maintain a $TiO_2$ content of the bed of at least 85 percent by weight based on the total $TiO_2$ and iron content in the bed, and the ratio of chlorinatable iron to chlorinatable titanium in the bed substantially below 1 to 10 and substantially below the ratio of said materials in the iron-titanium bearing material fed into the bed, whereby the chlorinatable iron and chlorinatable titanium in said bed are continuously chlorinated at a ratio substantially the same as the ratio of said materials maintained in said bed.

11. A method of preparing titanium tetrachloride which comprises establishing a fluidized bed, comprising carbon particles and particles of rutile as the principal chloridizable component of the bed, in an upwardly flowing stream of chlorine, the ratio of chlorinatable iron to chlorinatable titanium in the bed being below 0.1 to 1 maintaining the temperature of the bed at chlorination temperature, and adding ilmenite and carbon to said bed whereby to form simultaneously both iron chloride and titanium tetrachloride substantially in the molecular proportion of that of the iron and titanium in the ilmenite and controlling the rate of addition of said ilmenite to maintain the ratio of chlorinatable iron to chlorinatable titanium in said bed below 0.1 to 1.

12. A method of preparing titanium tetrachloride which comprises establishing a fluidized bed, comprising carbon particles and particles of titanium dioxide, the $TiO_2$ content of the bed being at least 85 percent by weight based on the total $TiO_2$ and iron content in the bed, in an upwardly flowing stream of chlorine, maintaining the temperature of the bed at chlorination temperature whereby to form and volatilize titanium tetrachloride, and adding ilmenite and carbon to said bed whereby to form simultaneously both iron chloride and titanium tetrachloride, and controlling the rate of introduction of said ilmenite into said fluidized bed to maintain the $TiO_2$ content of the bed at least 85 percent by weight based on the total $TiO_2$ and iron content in the bed.

References Cited in the file of this patent

UNITED STATES PATENTS

| 2,486,912 | Belchetz | Nov. 1, 1949 |
| 2,533,021 | Krchma | Dec. 5, 1950 |
| 2,701,179 | McKinney | Feb. 1, 1955 |
| 2,701,180 | Krchma | Feb. 1, 1955 |

OTHER REFERENCES

Barksdale's book on "Titanium," pages 33 and 34, 1949 ed., Ronald Press Co., New York.

UNITED STATES PATENT OFFICE

CERTIFICATE OF CORRECTION

Patent No. 2,883,265                                             April 21, 1959

Arthur W. Evans et al

It is hereby certified that error appears in the printed specification of the above numbered patent requiring correction and that the said Letters Patent should read as corrected below.

Column 3, line 58, for "ioron" read -- iron --; column 4, line 15, before "particularly" insert an opening parenthesis; line 17, after "percent" insert a closing parenthesis; column 4, lines 17 and 18, strike out "in the iron content in amount more than 2 or 3 percent"; column 7, lines 34 and 35, strike out "and the $TiO_2$ content of the bed is at least 90% by weight".

Signed and sealed this 5th day of April 1960.

(SEAL)
Attest:

KARL H. AXLINE                                           ROBERT C. WATSON
Attesting Officer                                         Commissioner of Patents